Figure 1:
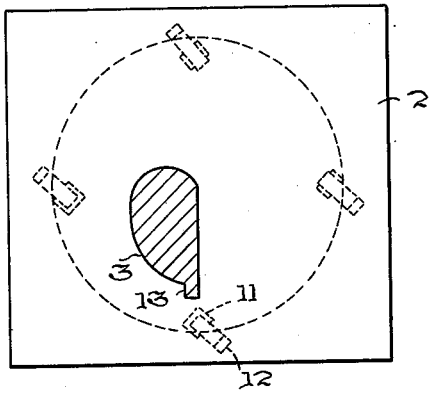

Oct. 10, 1950 A. WHITE 2,524,862
METHOD AND APPARATUS FOR PRODUCING CAST SYNTHETIC RESIN
STRUCTURES BY PHOTOPOLYMERIZATION OF MONOMERIC MATERIAL
Filed July 30, 1947

INVENTOR.
ALAN WHITE
BY
ATTORNEY

Patented Oct. 10, 1950

2,524,862

UNITED STATES PATENT OFFICE 2,524,862

METHOD AND APPARATUS FOR PRODUCING CAST SYNTHETIC RESIN STRUCTURES BY PHOTOPOLYMERIZATION OF MONOMERIC MATERIAL

Alan White, Hatfield, England, assignor to Imperial Chemical Industries Limited, a corporation of Great Britain Application July 30, 1947, Serial No. 764,735
In Great Britain July 16, 1946

38 Claims. (Cl. 18—26)

This invention relates to an improved process for the production of optical elements consisting essentially of transparent polymeric materials, particularly lenses and mirrors. Although it is well-known that certain unsaturated organic compounds can be converted to resinous materials by photopolymerisation, the application of this principle to the casting of articles suitable for use as optical elements has been attended by a serious difficulty which it has not, hitherto, been possible to overcome. That is, as photopolymerisation proceeds to the stage at which a solid resin forms, small voids and internal strains often make their appearance and persist, in the fully polymerised product, detracting considerably from the utility of the product.

It is an object of the present invention to provide an improved process for the production of optical elements. It is a further object to provide an improved process for the production of optical elements composed essentially of transparent polymeric materials, whereby said elements are obtained in a more bubble-free and strain free state than has hitherto been found possible. Other objects will appear hereinafter.

We have now found that optical elements, which possess an axis of reference such that the thickness of the element, measured parallel to the said axis, at all points in the element at a given distance from the said axis is substantially constant, can be manufactured in an improved manner by a process which comprises subjecting a liquid photopolymerisable monomeric compound possessing the group $>C=C<$ in the molecule, or a liquid partial polymer derived therefrom, to the polymerising action of light in a mould having internal surfaces conforming to the shape of the said optical element until a solid body is formed, the average quantity of light falling per unit time upon the said monomeric compound or partial polymer being controlled according to the equation $$Q_x = kt_x(1-Bx)$$

where $Q_x$ is the average quantity of light falling per unit time upon the said monomeric compound or partial polymer at a distance $x$ from the said axis of reference, $t_x$ is the average value of the thickness of the material undergoing polymerisation, measured in the direction of the incident light, at a distance $x$ from the axis of reference, $k$ is an arbitrary constant greater than zero and $B$ has any positive value greater than 0 and less than $1/r$ where $r$ is the maximum value of $x$, that is, the semidiameter of the interior surface of the mould.

The said light preferably falls upon the said monomeric compound or partial polymer in a direction substantially parallel to the said axis of reference. Since it is desirable that the illumination at any point shall be as constant as possible it is preferred that the value of $Q_x$ be related to a unit of time as small as possible, for example, per minute or per second. It is not usually related to a period greater than an hour since irregularities in the intensity of light permitted by a unit period of greater length frequently result in lack of homogeneity in the product obtained by our process.

It will be obvious that the mould surface through which the said monomeric compound or partial polymer is illuminated must be substantially transparent to light. For this reason glass moulds are customarily employed. Suitable jigs are necessary to hold any two portions of a mould so that they are correctly disposed to each other.

The process of our invention has been found particularly useful in the production of convex lenses and convex surface-metallised mirrors. Our invention is not, however, restricted in this respect and the process may also be applied to concave, concavo-convex and aspherical optical elements, for example, Schmidt lenses.

The process of the present invention finds its greatest utility when applied to the manufacture of a thin optical element, that is, an element in which the maximum variation of thickness is small in proportion to its radius, for example, not greater than ½. For thin optical elements, values of $B$ not greater than $1/10r$ are found most suitable, since the use of conditions in which $B$ has a greater value than $1/10r$ usually leads to a reduction in the degree of homogeneity in the element obtained and to breakages of the moulds, when these are constructed of glass.

As the value of $B$ is made smaller, the equation $$Q_x = kt_x(1-Bx)$$

approximates to $$Q_x = kt_x$$

that is, the average quantity of light per unit time falling upon the compound undergoing polymerisation at a distance $x$ from the axis or reference is proportional to the thickness of the mass undergoing polymerisation at a distance $x$ from the axis of reference.

Under the conditions given by the equation $$Q_x = kt_x$$

the formation of bubbles in the casting is not as extensive as is the case where uniform illumination is employed. Nevertheless, for most optical purposes, elements are required which have a very high degree of freedom from bubbles and internal strains and it is therefore generally preferred that the value of B, as hereinbefore defined, should exceed $1/100r$. Under these conditions, polymerisation takes places rather more rapidly in the centre of the mould than at the edges, and this allows polymerisable liquid to be drawn from the edges of the mould as the shrinkage which accompanies polymerisation proceeds, thereby preventing the formation of voids and internal strains in the casting.

Monomeric compounds which may be employed in the process of the present invention include acrylic and substituted acrylic acids and esters, for example acrylic and methacrylic acids, methyl methacrylate, cyclohexyl methacrylate, 2, 2, 2-trifluoroethyl methacrylate and esters of alpha-fluoroacrylic acid and fluorinated alcohols; styrene; vinyl esters such as vinyl acetate; and compounds containing more than one $>C—C<$ group, such as allyl methacrylate and diallyl fumarate. Mixtures of two or more of these compounds may also be used. The preferred compounds are methyl methacrylate and styrene.

The composition which is to be cast according to the present process can be in any liquid form. Preferably it is employed in the form of a syrup. This can be prepared by the partial polymerisation of the polymerisable constituent or constituents of the composition before its introduction into the mould or by dissolving a polymeric material in the monomeric constituent or constituents. If desired the two methods can be employed in combination.

The syrup should preferably be submitted to a vacuum treatment before use in order to remove bubbles, for example, by subjecting it in a cylinder having a height not greater than its diameter to a vacuum of less than 10 centimeters of mercury pressure for one hour. The syrup should also have a viscosity of less than 700 poises at 20° C. or it will not pour satisfactorily and air bubbles tend to become trapped in it.

When working with a syrup consisting essentially of polymethyl methacrylate dissolved in methyl methacrylate monomer, the syrup preferably contains at least 35% by weight of polymer. When polystyrene is used, the syrup preferably contains not less than 40% by weight of polymer.

The syrups may be prepared by dissolving a polymer in a monomer or by heating and/or subjecting to light one or more monomers until the desired amount of polymer has been produced in situ. It is generally desirable that the syrup of the polymer dissolved in monomer contains a polymer of low molecular weight so that a fairly high concentration of polymer can be achieved without producing a syrup of undesirably high viscosity. For example, when using polymethyl methacrylate, the preferred molecular weight range is that corresponding to a specific viscosity of 0.015 to 0.075 for a solution of 1 gm. of the polymer in 1 litre of chloroform at 20° C. Such low molecular weight polymers may be obtained in a variety of ways, for example, by malaxating polymers of higher molecular weight on hot rolls or by polymerising the corresponding monomer in the presence of large amounts of catalyst, such as benzoyl peroxide, or in the presence of a chain ending compound such as turpentine. Syrups of low molecular weight polymer in monomer may also be obtained by partially polymerising methyl methacrylate by means of light when it contains about 0.5% by weight of light activated polymerisation catalyst.

Light of any wavelength from the infra-red to the ultra-violet, inclusive, can be employed for effecting the photopolymerisation of the present invention. A convenient wavelength band is that between 1800 Å.—the limit of transmission of a quartz tube in a mercury arc vapour lamp—and 7000 Å.—the lower limit for the infra-red. The preferred wavelengths are those shorter than 7000 Å. Although wavelengths below 3200 Å. are effective, 3200 Å. is the lower limit of transmission of plate glass and since light passing through this material is frequently used in this process, 3200 Å. represents a lower preferred limit.

Preferably the photopolymerisation is conducted in the presence of a photopolymerisation catalyst. One group of photopolymerisation catalysts which may be employed consists of the alpha-carbonyl alcohols of the formula $$RCO—CHOH—R^1$$

wherein R and $R^1$ are the same or different and are hydrogen atoms or monovalent hydrocarbon radicals. A sub-class falling under this generic classification are the acyloins, which are organic compounds of the above type, wherein R and $R^1$ are aliphatic or aromatic hydrocarbon radicals and which are formed from two molecules of an aldehyde by interreaction of the aldehyde groups. Illustrative of these compounds are glycollic aldehyde, benzoin, acetoin, butyroin, 3-hydroxy-4-methyl-pentanone-2, toluin, tert-butylbenzoin, 12-hydroxy-13-ketotetracosane, and o and p-tert.-butytoluin. Of these, benzoin is the preferred specific compound. Hydrocarbon radicals bearing constituent atoms or radicals, e. g., halogen, sulpho, carbonyl, alkoxy and acyloxy groups, are for the purposes of this invention equivalent to hydrocarbon radicals in the photopolymerisation catalysts employed herein.

A second group is that of acyloin ethers of the formula

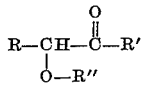

wherein R, R' and R'' are monovalent hydrocarbon radicals. Examples of compounds of this group include benzoin methyl ether, benzoin ethyl ether, benzoin propyl ether, pivaloin ethyl ether and anisoin methyl ether. Of these compounds, benzoin ethyl ether is preferred.

A third group of photopolymerisation catalysts which may be employed is that of adjacent polyketaldonyl compounds, which are compounds of the formula $R—(CO)_x—R^1$, wherein $x$ is an integer of two or three, preferably two, and R and $R^1$ are hydrogen or monovalent aliphatic or aromatic hydrocarbon radicals. Illustrative polyketaldonyl compounds are: diacetyl, pentanedione-2,3, octanedione-2,3, 1-phenyl-butanedione-1,2, benzil, 2,2-dimethyl-4-phenylbutanedione-3,4, glyoxal, phenyl-glyoxal, diphenyl triketone, and 1,2, cyclohexanedione. Of these, diacetyl is the preferred compound.

The concentration of photopolymerisation catalyst in the monomer is of importance because it appreciably affects the rate of polymerisation. From 0.01% to 1.0% of the photopolymerisation catalysts described above, by weight of the photopolymerisable compound, may be employed, with 0.08% to 0.15% preferred. When less than this amount of the photopolymerisation catalyst is employed the reaction proceeds more slowly and when greater amounts than this are used discoloration is apt to occur. Usually about 0.1% of an acyloin or diketone is employed, although either more or less can be used depending on the rate of polymerisation desired. Furthermore, these photopolymerisation catalysts need not be employed alone but can be used in conjunction with a peroxide. This has the advantage that if the monomer is only partially polymerised when irradiation is discontinued it will continue to polymerise at a fairly rapid rate and finally reach completion if the temperature is sufficiently high. Although benzoyl peroxide is the preferred peroxide for use, any organic solvent soluble peroxide may be used, for example, lauroyl peroxide, acetyl peroxide, butyroyl peroxide, succinyl peroxide, and ascoridole. In general, from 0.1% to 0.2% of peroxide, by weight of the photopolymerisable material, is preferred. Peroxides are not necessary in this reaction provided the exposure to light is long enough.

Instead of using one of the photopolymerisation catalysts described above, in the presence or absence of a peroxide, the polymerisation may be carried out in the presence of an organic azo compound in which the valencies of the azo group are attached to different non-aromatic carbon atoms. This method of operating the process of this invention is generally preferred because these azo catalysts are active catalysts for both heat and light activated polymerisation, and are very stable to oxidation, causing no discoloration of the products. The preferred azo compounds are those in which at least one and preferably both of the valencies of the azo group are satisfied by tertiary carbon atoms which are bonded to a negative substituent. Moreover, this substituent is preferably a neutral monovalent group, that is a non-acidic and non-basic monovalent group, the three remaining valencies of which are satisfied by nitrogen or oxygen atoms. Examples of such groups are the nitrile, carbalkoxy and carbonamido groups.

Examples of the preferred compounds for use in the process of this invention are alpha, alpha'-azodiisobutyronitrile; alpha, alpha'-azobis-(alpha,gamma-dimethylvaleronitrile); dimethyl and diethyl alpha, alpha'-azodiisobutyrates; 1,1-azodicyclohexanecarbonitrile; alpha, alpha'-azobis(alpha-ethylbutyronitrile); alpha, alpha'-azobis(alpha-ethylbutyronitrile); and alpha, alpha'-azodiisobutyrocarbonamide.

It is preferred to use from 0.0005% to 0.5% of the azo catalyst, by weight of the monomeric compound or partial polymer.

Any convenient method may be selected for obtaining the control of the value of $Q_x$ in the process of the present invention. According to a preferred method the process of the invention is operated using an apparatus comprising a source of light, a screen as hereinafter described, and a mould shaped for the casting of a lens having an axis of reference as described above, the source of light being positioned on the axis of reference and the screen interposed between the source of light and the mould, and the mould and screen being capable of continuous relative rotary movement.

The screen comprises either a disc of opaque material from which a suitably shaped sector has been removed, or a disc of opaque material in which a sector has been rendered transparent, or a transparent disc which has been rendered opaque except in a suitably shaped sector, the said sector covering all parts of the disc at which, using conventional polar coordinates, $$0 \leq \theta \leq kt_x(1-Bx)$$

taking the centre of the disc as the origin and any radius of the disc as the $x$ axis. The screen is mounted in such a manner that the aforesaid axis of reference passes through the origin, $k$ is an arbitary constant such that the value of $\theta$ is, at all values of $x$ and $t$, less than 360°, and B, $t_x$ and $x$ have the significance hereinbefore assigned.

The curves obtained by using different values of $k_0$ belong to the same family and all can be used in the invention. Preferably a value is chosen which makes the maximum value of $\theta$ approximately equal to 180°.

If desired, the disc can be characterised by the presence of more than one sector of the shape described, or the mirror image of that shape.

Thus a sector covering all parts of the disc at which $$-kt_x(1-Bx) \leq \theta \leq kt_x(1-Bx)$$

can be employed as a part of the preferred apparatus for use in the process of the present invention.

It is usually desirable to ensure that the "flash" adjoining the cast optical component should be adequately polymerised during the casting operation. In computing the shape of the sector which characterises the screen it is usually desirable, therefore, to treat at least that portion of the flash immediately adjacent to the optical component as being part of the optical component when applying the law.

$$0 \leq \theta \leq kt_x(1-Bx)$$

This will be more clearly appreciated by reference to the diagrams accompanying the present specification.

The disc can, and normally will, form part of a sheet of material, the extent and shape of the sheet outside the disc being, of course, a matter of no importance in the present invention.

The disc or sheet comprising the disc is preferably mounted between the light source and the mould, so that its centre is on the axis of reference of the mould, the disc or sheet comprising the disc lying in a plane at right angles to the axis of reference. Either the mould or screen is provided with means of rotation about the axis of reference so that continuous relative rotary movement can be maintained between the screen and the mould for the duration of polymerisation.

Normally the mould is rotated, for example on a turntable, and the screen held stationary. This obviates the necessity of designing a mounting and driving mechanism for the screen which does not interfere with the required distribution of light falling upon the mould.

Since it is preferred that the value of $Q_x$ be related to a unit of time as small as possible, and this value will not usually relate to a period greater than an hour, a rate of revolution of the mould or screen of the order of 0.1–10.0 revs./sec. is preferred.

As an alternative to the use of the preferred apparatus itself in the process of this invention, a light screen or filter may be prepared by substituting a photographic plate for the mould in this apparatus where parallel light is used and exposing this plate to the light source while there is continuous relative rotary movement of the plate and the screen. If non-parallel light is used, the photographic plate should of course be placed for this operation in the position in which the finished screen or filter will be placed relative to the light source and the mould in the casting of optical elements. The plate is then developed and fixed and a "negative" of a screen suitable for use in the process of this invention, that is, suitable for replacing the screen used in the production of the "negative" is thereby obtained. From this "negative" any number of "positive" screens may be obtained. These "positive" screens may be used advantageously in the process of the present invention since relative movement between these screens and the moulds is of course unnecessary, the screen simply being positioned between the light source and the mould so that the axes of the screen and mould are coincident. The "positive" screen may be prepared directly by positioning a photographic plate as described above and using a screen in which those parts which would normally be required to be opaque are transparent and those normally transparent are opaque, exposing the plate to the light source while there is continuous relative rotary movement of the plate and the screen, and developing and fixing the photographic plate.

Other suitable screens for use in the process of the present invention include those formed by shaped plates of light absorbing material or of pigmented transparent material the thickness of these plates being graduated to give a light transmission according to the equation given hereinbefore, and those formed by immersing a transparent plate having the shape and thickness of the required lens in a layer of uniform depth of a light-absorbing liquid.

Figure 2:
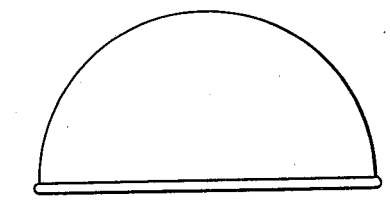

The preferred apparatus for use in the process of the present invention will be better understood with reference to the accompanying diagrams in which Figure 1 is a plan and Figure 2 an elevation of a typical apparatus for the casting of optical components.

The apparatus comprises:

1. A parabolic reflector containing an electric lamp.
2. An opaque screen having an accurately shaped sector 3 removed to provide a suitable orifice for the passage of light in accordance with the requirements hereinbefore described.

4 and 5 are upper and lower halves of the casting mould.

8. A gasket inserted between the two halves of the mould.
9. A turntable.
10. The turntable spindle.
11. Packing blocks and pads to enable circulation of cooling air between lower half of mould and turntable.
12. G clamps.

As stated hereinbefore the shape of the sector is preferably designed to allow for the polymerisation of the flash which exists between the mould surfaces, external to the optical element. The portion of the sector which serves this purpose is designated in Figure 1 by the numeral 13.

Figure 3:
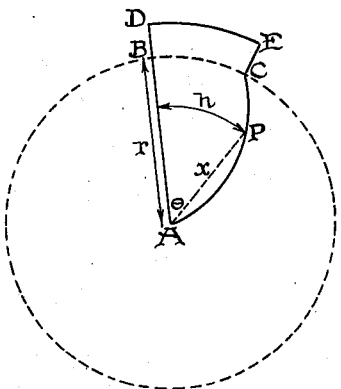

The method of calculating the required shape for the transparent or removed sector of the screens of the preferred apparatus for use in the process of the present invention will be understood from the following description in which reference is made to the accompanying Figure 3.

In the said Figure 3, ABC is the desired aperture for controlling the amount of light falling on to the mould, BCED being that part of the aperture designed to allow polymerisation of the flash, $r$ is the semi-diameter of the element to be made.

$h$ is the arc width of the aperture at radial distance $x$ from the centre A, $\theta$ is the angle made with a fixed radius AB by the radius vector from the point (P) on the edge of the aperture where the radial distance is $x$ from the centre.

The light incident on the mould is parallel.

The time of exposure of unit volume of syrup during one revolution of the mould will be proportional to $$\frac{h}{2\pi wx}$$

at a distance $x$ from the centre, where $w$ is the speed of rotation. If the intensity is I, then the quantity of light energy incident in unit time on unit volume of syrup at a distance $x$ from the centre will be given by $$Q_x \propto \frac{Ih}{2\pi wx}$$

But
$$Q_x = kt_x(1-Bx)$$
therefore $$\frac{Ih}{2\pi wx} \propto kt_x(1-Bx)$$

But $h = x\theta$
Therefore $$\frac{I\theta}{2\pi wk} \propto t_x(1-Bx)$$

Since I and $w$ are kept constant, we may write:

$$\theta \propto t_x(1-Bx)$$

i. e. $\theta = k_0 t_x(1-Bx)$ where $k_0$ is an arbitrary constant.

This is the polar equation of the aperture which gives the required light distribution. The aperture is prepared from opaque material by removing all parts of the material where $$0 \leq \theta \leq k_0 t_x(1-Bx)$$

as $x$ varies from zero to $r$.

Since $k_0$ can be a negative constant, the required light distribution can also be obtained by removing all parts of the material where, $$-k_0 t_x(1-Bx) \leq \theta \leq +k_0 t_x(1-Bx)$$

Where non parallel light is used, the shape of the sector is most conveniently determined by calculating the shape required for parallel light and then adjusting the value of B, several values of B being tried until bubble-free castings are obtained. In a similar way an empirical correction may be necessary to correct for light scattering by the mould and for variable light absorption of the syrup in the mould due to its variation in thickness.

It is often advantageous to interpose a graded diffusion screen between the light source and the screen to give a uniformly bright diffuse source. Since this light source is usually larger than the mould, the variation in intensity across the face of the mould is small. Moreover, this variation is not detrimental to the process since it gives a slightly greater intensity at the centre of the mould than at the edges.

By way of an example, the following calculation gives the aperture required for casting a 254 mm. radius of curvature, 50.8 mm. semi diameter double convex lens, using parallel light.

The thickness of the lens at a point distant $x$ from the centre is given by:

$$t_x = n + 2\sqrt{254^2 - x^2} - 2\sqrt{254^2 - 50.8^2}$$

Where $n$ is the thickness of the flash surrounding the lens; in this example $n=2.54$ mms.

Hence $t_x = 2\sqrt{64516 - x^2} - 495.2$.

The table below shows in columns 1 and 2 respectively values of $x$ from zero to 50.8 and the calculated values of $t_x$.

Column 3 gives the value of $1-B\bar{x}$ with $B=\frac{1}{1000}$.

Column 4 gives the product of $t_x$ and $(1-Bx)$.

Column 5 gives the product of column 4 and the arbitrary constant $k_0$ i. e. gives values of $\theta$.

In the example $k_0=15$ and $\theta$ max$=192°$.

| $x$ mms. | $t$ mms. | $1-\dfrac{x}{1000}$ | $t_x (1-Bx)$ | $\theta = k_0 t_x (1-Bx)$ |
|---|---|---|---|---|
| | | | | Degrees |
| 0 | 12.80 | 1.00 | 12.80 | 192.0 |
| 10 | 12.40 | 0.99 | 12.30 | 184.5 |
| 20 | 11.22 | 0.98 | 11.00 | 165.0 |
| 30 | 9.24 | 0.97 | 8.96 | 134.4 |
| 40 | 6.48 | 0.96 | 6.22 | 93.3 |
| 50.8 | 2.54 | 0.95 | 2.42 | 36.3 |
| 60 | 2.54 | 0.94 | 2.39 | 45.9 |

The values of $x$ from 50.8 to 60 are plotted to permit the polymerisation of a flash round the component. Between these values $t$ is constant and equals 2.54 mm.

Many more values of $x$ and $t$ are plotted than are shown in the table, to give greater accuracy.

I claim:

1. A process for the manufacture of cast structures of synthetic resinous material having a relatively high degree of homogeneity throughout the entire volume thereof and freedom from internal strains, which comprises polymerizing a liquid photopolymerizable composition comprising a photopolymerizable monomeric compound possessing at least one $>C=C<$ group in the molecule by subjecting the liquid composition to light while the liquid composition is confined in a mould having internal surfaces conforming to the shape of the desired cast structure until a solid body is formed, said light being radiated upon said liquid composition from a light source external of said mould with a screen positioned between said light source and said mould which regulates the passage of light from said light source to said mould, thus controlling the quantity of light per unit area per unit time falling from said light source upon said mould.

2. A process for the manufacture of cast synthetic resinous structures having a relatively high degree of homogeneity throughout the entire volume thereof which comprises confining a liquid photopolymerizable composition in a mould having internal surfaces defining the shape of the desired cast structure, radiating light from an external light source toward said liquid photopolymerizable composition and varying the quantity of light across the light irradiated area of said composition by intercepting some of the light which would normally fall upon said liquid composition from said light source by a screen positioned between said light source and said casting mould, while, at the same time, allowing the remainder of said light to fall upon said liquid composition.

3. A process for the manufacture of cast structures of synthetic resinous material which comprises polymerizing a liquid photopolymerizable composition comprising a photopolymerizable monomeric compound possessing at least one $>C=C<$ group in the molecule by subjecting the liquid composition to light while the liquid composition is confined in a mould having internal surfaces conforming to the shape of the desired cast structure until a solid body is formed, said light being radiated upon said liquid composition from a light source external of said mould with a substantially opaque screen between the light source and the mould, said opaque screen having at least one light-transmitting sector therein, and said mould and said screen being revolved relative to one another about a common axis during said polymerization.

4. A process for the manufacture of cast synthetic resinous structures which comprises irradiating a liquid photopolymerizable composition comprising a photopolymerizable monomeric compound possessing at least one $>C=C<$ group in the molecule with light from an external light source, while the liquid composition is confined in a mould having internal surfaces conforming to the shape of the desired cast structure until a solid cast structure is formed, the quantity of light falling upon any given portion of said liquid composition during said irradiation being controlled by interposing an opaque screen having a light transmitting sector between the light source and the irradiated surface of the liquid composition, and causing relative rotation between said screen and said mould about a common axis during said irradiation.

5. A process for the manufacture of cast synthetic resinous structures constituting a solid of revolution which comprises confining a liquid photopolymerizable composition comprising a photopolymerizable monomeric compound possessing at least one $>C=C<$ group in the molecule in a mould having internal surfaces defining substantially said solid of revolution, radiating light from an external light source toward said liquid photopolymerizable composition, intercepting some of the light which would normally fall upon said liquid composition from said light source by an opaque screen positioned between said light source and said casting mould while, at the same time, allowing the remainder of the light to fall upon a portion of the liquid composition through a light transmitting sector in said screen, successively irradiating successive portions of said liquid composition with said light, while discontinuing the irradiation of prior portions by relative rotation of said screen and said mould about the central axis of said solid of revolution, and continuing said irradiation of successive portions of the liquid composition until a solid body is formed.

6. A process for the manufacture of optical elements which possess an axis of reference such that the thickness of the element, measured parallel to said axis, at all points in the element at a given distance from said axis is substantially constant, which comprises subjecting a liquid photopolymerizable composition comprising a photopolymerizable monomeric compound possessing at least one $>C=C<$ group in the molecule to the polymerizing action of light in a mould having internal surfaces conforming to the shape of said element until a solid body is formed, the average quantity of light falling per unit time upon said liquid composition being in accordance with the equation $$Q_x = kt_x(1-Bx)$$

where $Q_x$ is the average quantity of light falling per unit time upon the said monomeric compound or partial polymer at a distance $x$ from the said axis of reference, $t_x$ is the average value of the thickness of the material undergoing polymerization, measured in the direction of the incident light, at a distance $x$ from the axis of reference, $k$ is an arbitrary constant greater than zero and B is any positive value greater than 0 and less than $1/r$, where $r$ is the semidiameter of the interior surface of the mould.

7. A process according to claim 6, in which said liquid photopolymerizable composition comprises a mixture of at least two organic compounds containing a $CH_2=C<$ group in the molecule.

8. A process according to claim 6, in which said mixture is employed as a syrup produced by partial polymerization of said organic compounds.

9. A process according to claim 6, in which said monomeric compound is employed in the form of a syrup containing polymers of the monomer dissolved in the monomer.

10. A process according to claim 9, in which said liquid composition is a syrup which is free from bubbles and has a viscosity of less than 700 poises at 20° C.

11. A process according to claim 10, in which said syrup consists of at least 35% by weight of polymethyl methacrylate dissolved in the monomeric methyl methacrylate.

12. A process according to claim 11, in which the specific viscosity of a solution of 1 gm. of said polymethyl methacrylate in 1 liter chloroform at 20° C. is 0.015 to 0.075.

13. A process according to claim 6, in which said liquid composition is subjected to the action of light in the presence of 0.08 to 0.15% by weight of the liquid composition of a photopolymerization catalyst.

14. A process according to claim 13, in which said photopolymerization catalyst is employed in conjunction with an organic peroxide.

15. A process according to claim 14, in which said organic peroxide is benzoyl peroxide.

16. A process according to claim 15, in which from 0.1% to 0.2% of said peroxide, based on the weight of the liquid composition, is employed.

17. A process according to claim 6, in which said liquid composition is subjected to the action of light in the presence of a polyketaldonyl compound.

18. A process according to claim 17, in which said polyketaldonyl compound is diacetyl.

19. A process according to claim 6, in which said liquid composition is subjected to the action of light in the presence of an acyloin ether.

20. A process according to claim 19, in which said acyloin ether is benzoin ethyl ether.

21. A process according to claim 6, in which said liquid composition is subjected to the action of light in the presence of an acyloin.

22. A process according to claim 21, in which said acyloin is benzoin.

23. A process according to claim 6, in which the quantity of light falling upon said mould is controlled by interposing a screen between the surface of the liquid composition and the source of light, said screen comprising a substantially opaque disk having a light transmitting sector shaped substantially in accordance with the inequality $0 \leq \theta \leq kt_x(1-Bx)$, in which, using conventional polar coordinates and taking the center of the disk as the origin with any radius as the initial line, the equation components are as indicated in claim 6, said disk being mounted so that said axis of reference passes through the origin, the source of light being positioned on the axis of reference, and the screen and liquid composition being revolved relative to one another during the polymerization.

24. A process according to claim 23 in which said disc is a plane at right angles to the axis of reference of said mould.

25. A process according to claim 24 in which said disc is held stationary.

26. A process according to claim 25 in which the relative rate of rotation of said screen to said mould is 0.1 to 10.0 rev./sec.

27. A process according to claim 6 in which the light falls upon the said liquid composition in a direction substantially parallel to the said axis of reference.

28. A process according to claim 6 wherein the value of B is not greater than $1/10\ r$ or smaller than $1/100\ r$.

29. A process according to claim 6 in which said monomeric compound is methyl methacrylate.

30. A process according to claim 6 in which the said monomeric compound is styrone.

31. A process according to claim 30 in which the liquid composition consists of at least 40% by weight of polystryene dissolved in monomeric stryene.

32. A process according to claim 6 in which said liquid composition is subjected to the action of light of wave length within the range of 3200–7000 Ångstroms.

33. A process according to claim 6 in which said liquid composition is subjected to the action of light in the presence of a photopolymerisation catalyst.

34. A process according to claim 33 in which said photopolymerisation catalyst is an acyloin.

35. Apparatus for the manufacture of cast synthetic resinous structures by light catalyzed polymerization which comprises a casting mould comprising a light transparent casting surface, a light source adapted to irradiate said transparent casting surface with light, means to control the quantity of light falling upon said transparent casting surface from said light source comprising a substanially opaque screen, having at least one light transmitting sector, positioned between said light source and said transparent casting surface, and means for causing relative rotation between said screen and said mould about a common axis passing through said transparent casting surface.

36. Apparatus for the manufacture of cast synthetic resinous structures having a relatively high degree of homogenity throughout the entire volume thereof and freedom from internal strains by light-catalyzed polymerization which comprises a casting mould comprising a light-transparent casting surface, a light source adapted to irradiate said transparent casting surface with light, and a light-regulating screen having light-opaque sectors therein positioned between said mould and said light source for shading portions of said light transparent casting surface from the light irradiated from said light source.

37. An apparatus for use in the casting of synthetic resinous optical elements which constitute a solid of revolution which comprises in combination a source of light, a mould having internal casting surfaces defining the desired solid of revolution, said mould having a casting surface which is transparent to the light admitted from said light source, a screen interposed between said light source and said light transparent casting surface, said screen comprising a substantially opaque disk having at least one light transmitting sector havin a contour in accordance with the inequality $0 \leq \theta \leq kt_x(1-Bx)$, in which, using conventional polar coordinates and taking the center of the disk as the origin with any radius as the initial line, $k$ is an arbitrary constant such that the value of $\theta$ is, at all values of $x$ and $t$, less than 360°, $x$ is any point upon the disk, B is any positive value greater than zero and less than $1/r$, where $r$ is the radius of the disk and $t_x$ is the thickness of the liquid composition undergoing polymerization measured parallel to the axis of revolution of said solid of revolution, the center of the disk being axially aligned with said center of revolution, and means for causing continuous relative rotary movement between the mould and the screen about their common axis.

38. An apparatus suitable for use in the casting of optical elements which possess an axis of reference such that the thickness of the lens, measured parallel to the said axis, at all points in the lens at a given distance from the axis is substantially constant, which comprises a source of light, a mould having the shape of the desired finished element, and a screen comprising a disc having at least one sector which permits the passage of light, said sector extending over all parts of the disc at which, using conventional polar coordinates.

$$0 \leq \theta \leq kt_x(1-Bx)$$

taking the centre of the disc as the origin and any radius of the disc as the $x$ axis, said screen being interposed between said light source and said mould and being mounted so that the axis of reference of said mould passes through the origin, $t_x$ being the average value of the thickness of the material undergoing polymerisation, measured in the direction of the incident light at a distance $x$ from the axis of rotation, B having any positive value greater than zero and less than $1/r$ where $r$ is the maximum value of $x$, and K being an arbitrary constant such that the value of $\theta$ is, at all values of $x$ and $t$, less than 360° C., all other parts of the disc being opaque, the source of light being positioned on the axis of reference of the mould, and the mould and screen being capable of continuous relative rotary movement.

ALAN WHITE.

REFERENCES CITED

The following references are of record in the file of this patent:

UNITED STATES PATENTS

| Number | Name | Date |
| --- | --- | --- |
| 2,193,742 | Rohm et al. | Mar. 12, 1940 |
| 2,367,660 | Agre | Jan. 25, 1945 |
| 2,367,661 | Agre | Jan. 25, 1945 |